United States Patent Office 3,646,144
Patented Feb. 29, 1972

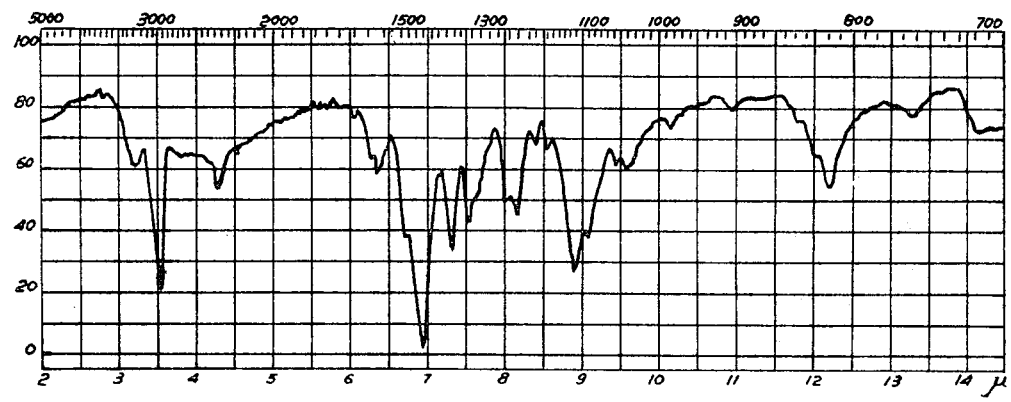

3,646,144
DRUG WITH HYPERTENSIVE ACTION ON THE BASE OF 1-(3,4 - DIMETHOXY - 4-HYDROXY-PHENYL)-2-MONOMETHYLAMINOETHANOL
Mario Giani, Milan, Luigi Molteni, Malnate, Varese, and Enzo Gori, Milan, Italy, assignors to Dr. L. Zambeletti S.p.A., Milan, Italy
Filed Oct. 25, 1967, Ser. No. 680,611
Claims priority, application Italy, May 11, 1967, 15,981/67
Int. Cl. C07c 91/34
U.S. Cl. 260—570.6                1 Claim

ABSTRACT OF THE DISCLOSURE

1 - (3,5 - dialkoxy - 4 - hydroxyphenyl)-2-monoalkyl-aminoalkanols and especially 1 - (3,5 - dimethoxy-4-hydroxyphenyl)-2-monomethylaminoethanol can be profitably employed in therapy as drugs with hypertensive action. The preferred compound has evidenced an unequivocal hypertensive effect through oral, intramuscular or endovenous way. It can be obtained from acetylsyringic acid chloride via diazoketone, chloroketone reaction of the latter with monomethylamine and catalytic reduction.

The present invention relates to a class of compounds designated 1 - (3,5 - dialkoxy - 4 - hydroxyphenyl)-2-monoalkylamino-alkanols, and especially 1 - (3,5 - dimethoxy - 4 - hydroxyphenyl)-2-monomethylaminoethanol, the non-toxic salts thereof with organic or inorganic acids as well as the method for their preparation.

A number of investigators have engaged in the study of new sympathomimetic substances or adrenergic amines, namely such substances which could be substituted for adrenalin and would offer, in contrast with adrenalin, pharmaceutical and therapeutical advantages so far as either stability or the duration and kind of pressor action are involved. A series of synthetic sympathomimetic amines was so originated, in whose characteristic molecule new elements were introduced or groupings were substituted.

Substances free of one or both nuclear hydroxyl groups have been prepared; positions of said hydroxyls with respect to the side chain have been changed; substances (I) with and without the alcohol hydroxyl (R') have been prepared; the chain in R" has been lengthened; and finally alkyl residues different from methyl have been introduced in R''' and R'''', in the following formula:

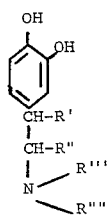

All of these substances, although having maintained to a more or less remarkable extent the characteristic vasopressor action of adrenalin, and still exhibiting in some cases a chemical stability higher than that of adrenalin itself, show drawbacks of various kinds with regard to their biological action, or the difficulty of obtaining them from the chemical point of view, or negative side effects, etc.

It has now been found that 1-(3,5-dialkoxy-4-hydroxyphenyl)-2-monoalkylaminoalkanols, and especially 1-(3,5-dimethoxy - 4 - hydroxyphenyl) - 2 - monomethylamino-ethanol, of Formula II and Formula III, respectively, show such characteristics as to allow them to be profitably employed in therapy as drugs with hypertensive action:

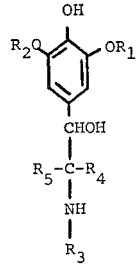

in which $R_1$, $R_2$ and $R_3$ each are alkyl, preferably containing one to three carbon atoms, and $R_4$ and $R_5$ are hydrogen or alkyl, preferably containing one to three carbon atoms.

Exemplary compounds include the following:

1-(3,5-dimethoxy-4-hydroxyphenyl)-2-ethylaminoethanol
1-(3,5-diethoxy-4-hydroxyphenyl)-2-methylamino-propanol
1-(3,5-dimethoxy-4-hydroxyphenyl)-2-isopropylamino-ethanol
1-(3,4-dimethoxy-4-hydroxyphenyl)-2-methylamino-2-methylpropanol
1-(3,5-dimethoxy-4-hydroxyphenyl)-2-methylamino-butanol.

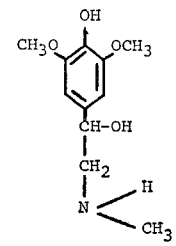

The present substances, especially that illustrated by Formula III, are stable, evidence an unequivocal hypertensive effect through the following administration routes: oral, intramuscular or endovenous. Most important, their effect proves to be particularly durable, which is one of the most valuable characteristics for such substances, namely, an action prolonged in the time and not followed by the classical "rebound effect."

Compound of Formula II may be prepared by reaction of an amine ($R_3NH_2$) with a compound of Formula IV:

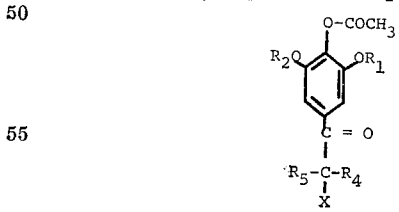

in which X is halogen, preferably chlorine, followed by reduction of the keto function to the secondary alcohol group and hydrolysis of the nuclear acetoxy group to the free phenolic hydroxy group. The Formula IV compounds may be prepared by art-recognized procedures, e.g., by halogenation of corresponding compounds in which X is hydrogen.

By way of illustration, the compound of Formula III is obtained by starting with acetylsyringic acid chloride, which is converted by means of diazomethane to 3,5-dimethoxy-4-acetoxy-diazoacetophenone. This latter compound is converted by treatment with hydrochloric acid to the corresponding chloroketone, which is allowed to react with monomethylamine and is converted to ω-monomethylamino-3,5-dimethoxy-4-hydroxyacetophenone. It is interesting that the substitution of the chlorine atom with the monomethylamino residue is accomplished by simultaneous transformation of the acetoxyl group to a hydroxyl group. The compound is then reduced with hydrogen on platinum to obtain the final substance of Formula III which may be converted by known methods to non-toxic salts with organic or inorganic acids. The process is illustrated by the following:

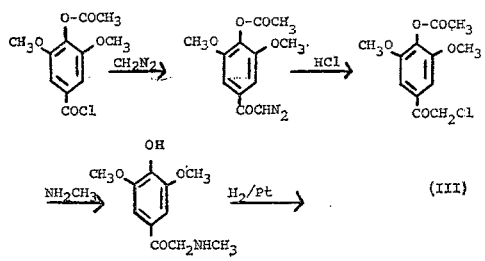

The present invention embraces all salts, including acid-addition and metal salts, of the newly recognized compounds. The well known procedures for preparing salts of such compounds are applicable here and are illustrated by examples appearing hereinafter. Such salts may be formed with both pharmaceutically acceptable and pharmaceutically unacceptable acids and metals. By "pharmaceptically acceptable" is meant those salt-forming acids and metals which do not substantially increase the toxicity of the compound. The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gluonic, succinic, arylsulfonic, e.g. p-toluenesulfonic acids, and the like. The pharmaceutically unacceptable acid addition salts, while not useful for therapy, are valuable for isolation and purification of the newly recognized compounds. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochloride, by solution in hydrochloric acid and crystallization of the hydrochloride salt formed. The perchloric acid salts are useful for purification and crystallization of the new compounds.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20, i.e. magnesium and calcium, and additionally, aluminum, zinc, iron and manganese, among others. The pharmaceutically unacceptable metal salts embrace most commonly salts of lithium and of alkaline earth metals of atomic number greater than 20, i.e. barium and strontium which are useful for isolation and purifying the compounds.

It will be obvious that, in addition to their value in therapy, the pharmaceutically acceptable acid and metal salts are also useful in isolation and purification.

The following example serves to further illustrate the invention.

EXAMPLE (a) 3,5-dimethoxy-4-acetoxy-diazoacetophenone

In a suitable vessel provided with stirrer, thermometer, reflux condenser with calcium chloride tube and externally cooled, a diazomethane ethereal solution was introduced (obtained from 900 g. potassium hydroxide in 1.5 liters of water, 5.250 liters ethylene glycolmonoethylether, 1500 liters ether and 3.225 kg. N-methyl-N-nitroso-p toluenesulfonamide in 18.75 liters ether).

While keeping the temperature between 0° C. and 5° C., the solution of 575 g. acetylsyringic acid chloride in 20 liters ether is added dropwise. After stirring cold for 6 hours, the precipitated yellow diazoketone is filtered and then dried under vacuum. Yield=445 g.—M.P. 107°–109° C.

(b) ω-Chloro-3,5-dimethoxy-4-acetoxy-acetophenone

In a suitable vessel 534 g. 3,5-dimethoxy-4-acetoxy-diazoacetophenone are introduced together with a mixture of 480 ml. hydrochloric acid (D=1.18), 480 ml. water and 1080 ml. methanol. An exothermic reaction with gas release occurs; it is stirred at intervals for 4–5 hours, then it is cooled and filtered. The product is washed with cold water and crystallized from pure alcohol. Yield=426 g.—M.P.=132°–134° C.

(c) Monomethylamino-3,5-dimethoxy-4-hydroxyacetophenone hydrochloride 800 g. ω-chloro-3,5-dimethoxy-4-acetoxyacetophenone, 2 liters pure alcohol and 5 liters of 35% monomethylamine are introduced in a suitable vessel. The mixture is heated cautiously until reaching the inner temperature of 50°–60° C. which is kept for 3 hours under stirring, whereafter the solvents and the monomethylamine excess are distilled under reduced pressure until there is obtained an almost dry residue. The residue is filtered, washed with ice-water and dried under vacuum. 500 g. of yellowish product are obtained, a sample of which when crystallized from ethanol melts at 160° C. The raw base is suspended in methanol. By acidification with a hydrochloric acid-methanol solution complete solubilization occurs accompanied by slight warming.

After filtering with charcoal and treating with excess, the hydrochloride separates by crystallization in the form of white crystals. Yield=440 g.—M.P.=238°–241° C. (with decomposition).

(d) 1-(3,5-dimethoxy-4-hydroxyphenyl)-2-monomethylaminoethanol hydrochloride

In a suitable vessel a solution is introduced of 600 g. monomethylamino-3,5 - dimethoxy - 4 - hydroxyacetophenone hydrochloride in a mixture of 2 liters water and 2 liters methanol. The mixture is then reduced with hydrogen under atmospheric pressure in the presence of 60 g. $PtO_2$. When the theoretical amount of hydrogen has been absorbed, the catalyst is filtered off and the filtered solution is brought to dryness on water-bath under reduced pressure. An oil is left which is dissolved in methanol and warm filtered.

By ether addition the hydrochloride separates having M.P. 171°–173° C. Yield=540 g.

The hydrochloride is: very soluble in water, soluble in water-alcohol mixtures, soluble 1:50 in 95% alcohol, 1:25 in methanol, slightly soluble in acetone and ethyl acetate, substantially insoluble in ether, chloroform, carbon tetrachloride and benzene.

A concentrated water solution of the hydrochloride, when made alkaline with saturated potassium carbonate solution, liberates the free base which forms as a white microcrystalline powder having M.P. 178° (with decomposition).

The base is: soluble in alcohol 1:100, insoluble in ether, benzene, carbon tetrachloride, and chloroform, and soluble in alkaline hydroxides. On infrared analysis, the base shows the herein enclosed spectrum.

From a solution of the base dissolved in alcohol in the proportion of 1 mole in 100 parts, on addition of 1 mole dibenzoyltartaric acid or 1 mole tartaric acid or 1 mole malic acid, the respective salts separate, having the following respective melting points: 176°–178°; 114°–115°; 194°–198° C.

Pharmacology of 1-(3,5-dimethoxy-4-hydroxyphenyl)-2-monomethylaminaethanol hydrochloride Sympathomimethic amine, water soluble (as the hydrochloride), pK 9.71 (middle value between ephedrine pK:9.5 and the one of 1-adrenalin:10.2.)

Distinct and durable hypertensive effect in any species (rat, guinea pig, rabbit, cat, dog) and through any route (endovenous, intraperitoneal, intramuscular, oral route).

Endrovenous $ED_{50}$ varies between 0.5 and 0.8 mg./kg. hence lesser than that of Synephrine [1-(4-hydroxyphenyl)-2-monomethylaminoethanol, racemic form] comprised between 1.5 and 2 mg./kg. and greater than that of phenylephrine [1 - 1(3 - hydroxyphenyl)-2-monomethylaminoethanol], equal to about 0.03 mg./kg.

Duration of the effect by i.p. and i.m. route is about 2–3 times higher than that of an equally effective dose of Synephrine.

By slow venoclysis in the rabbit, the $ED_{20}$ is 0.14 mg./kg./minute, with a persistence of the pressor effect for an additional 9 minutes after administration as compared to 0.42 mg./kg./minute of Synephrine by a persistence of no more than 3 minutes.

Pressor effect does not undergo skeptophylaxis.

Pressor effect is always accompanied in the rabbit and the dog with a distinct sinusual bradycardic, proportionally correlated, of reflex nature since it is absolished by vagostomy.

Pressor effect is accompanied with an increase of the inotropism (however not of chronotropism), demonstrable either on the isolated heart or on the animal "in toto."

The substance is active "in vitro" in causing deferent contraction in the rat; however, is inactive on the bronchial smooth musculature.

The substance is active "in vivo," at the dose $ED_{50}$, in causing the nictitant contraction, in inhibiting the intestinal peristalsis; on the contrary, it is unable, at the same doses, to cause hyperglycemia and to mobilize the NEFA. Only at very high doses exophthalmus, hair erection and hyperthermia could be found.

It may be antagonized in its pressor effect by dihydroerogtamine.

Accordingly the substance may be classified as a sympathomimetic with far prevailing effects on the alpha-receptors.

No other remarkable pharmacological activity was evidenced.

Acute toxocity of the drug often exhibits diphasicity phenomena (however frequent for the sympathomimetic amines) so that the $LD_{50}$ cannot be always rigorously defined.

$LD_{50}$ by i.v. route lies in the range 16–160 mg./kg. in the mouse, 4–25 mg./kg. in the cat and about 30 mg./kg. in the rabbit; by i.p. route, it is 762 mg./kg. in the mouse, 426 mg./kg. in the rat, 1060 in guinea pig and about 500 in the rabbit.

Ratio $LD_{50}/ED_{50}$ is generally always higher than 10.

Administration, prolonged for 3 months, of 40 mg./kg. i.p. of drug in the rat, of 3 mg./kg. i.m. in the dog (both pressor doses $ED_{50}$ in the respective species) did not cause any remarkable morpho-functional change, as it appears by weekly determination of functional parameters (animal weight, consumption, food hemoglobin, erythrocytes, leukocyte form, glycemia, azotemia, cholesterolemia, glutamic-pyruvic and glutamic-oxalacetic transaminase, alkaline phosphatase, lactic-dehydrogenase, bilisubinemia, bromosulfophthalein test, urine complete examination, phenol-red test) as well as, by final hystological examination of the main parenchyma (brains, heart, liver digesting, kidney, spleen, testicles and ovaries, thyroid, adrenal, pancreas).

Histologically determined local tolerance is equal to that of Synephrine.

It will be recognized that the product as produced in accordance with the procedure illustrated is a mixture of $d$ and $l$ forms which may be separated employing standard methods commonly used for separating optical isomers.

What we claim is:

1. A process for preparing 1-(3,5-dimethoxy-4-hydroxyphenyl)-2-monomethylaminoethanol, which comprises:
   (1) forming a diazomethane ethereal solution from aqueous potassium hydroxide in ethylene glycol monoethyl, and N - methyl - N - nitroso - p - toluenesulfonamide;
   (2) reacting at 0° C. to 5° C., a solution of acetylsyringic acid chloride in ether with the diazomethane ethereal solution of (1) to form 3,5-dimethoxy-4-acetoxy-diazoacetophenone;
   (3) reacting the diazoacetophenone of (2) with hydrochloric acid in aqueous methanol to form ω-chloro-3,5-dimethoxy-4-acetoxy-acetophenone;
   (4) reacting the acetophenone formed in (3) with an alcoholic solution of monoethylamine at 50° C. to 60° C. to form ω-monomethylamino-3,5-dimethoxy-4-hydroxyacetophenone;
   (5) acidifying the hydroxyacetophenone formed in (4) to form the corresponding hydrochloride thereof;
   (6) reacting the hydrochloride formed in (5) with hydrogen in the presence of $PtO_2$ and aqueous methanol to form 1-(3,5-dimethoxy-4-hydroxyphenyl)-2-monoethylaminoethanol hydrochloride; and
   (7) reacting the hydrochloride formed in (6) with potassium carbonate to form 1-(3,5-dimethoxy-4-hydroxyphenyl)-2-monomethylaminoethanol.

References Cited

UNITED STATES PATENTS

| | | | |
|---|---|---|---|
| 2,976,319 | 3/1961 | Rudner | 260—501.17 |
| 3,192,253 | 6/1965 | Boscott | 260—501.17 |

FOREIGN PATENTS

| | | | |
|---|---|---|---|
| 865,315 | 7/1949 | Germany | 260—570.6 |

OTHER REFERENCES

Chemical Index of Chemical Abstracts (I), volume 61, American Chemical Society, pp. 400S and 403S (received July 16, 1965).

Chemical Abstracts (II), volume 61, col. 3402, Coward et al. (1964).

Heacock et al.: Canadian Journal of Chemistry, volume 40, pp. 128–132 (1962).

Steinberg et al.: Journal of Organic Chemistry, volume 13, pp. 413–420 (1948).

Dictionary of Organic Compounds Oxford University Press, vol. 5, pp. 2943–4 (received Dec. 17, 1965).

LEON ZITVER, Primary Examiner

M. W. GLYNN, Assistant Examiner

U.S. Cl. X.R.

260—501.17, 479 R, 239 AA, 999